US008746180B2

(12) United States Patent
Moser

(10) Patent No.: US 8,746,180 B2
(45) Date of Patent: Jun. 10, 2014

(54) DOG TOY

(71) Applicant: Stephen Moser, Southfield, MI (US)

(72) Inventor: Stephen Moser, Southfield, MI (US)

(*) Notice: Subject to any disclaimer, the term of this patent is extended or adjusted under 35 U.S.C. 154(b) by 0 days.

(21) Appl. No.: 13/739,306

(22) Filed: Jan. 11, 2013

(65) Prior Publication Data
US 2013/0180465 A1 Jul. 18, 2013

Related U.S. Application Data

(60) Provisional application No. 61/585,815, filed on Jan. 12, 2012.

(51) Int. Cl.
*A01K 29/00* (2006.01)
*A63H 27/00* (2006.01)

(52) U.S. Cl.
USPC .............................. 119/707; 119/709; 446/34

(58) Field of Classification Search
USPC .......... 119/707, 702, 709, 710, 711; 446/255, 446/34; D30/160
See application file for complete search history.

(56) References Cited

U.S. PATENT DOCUMENTS

| 3,315,640 | A | * | 4/1967 | Gamble | 119/707 |
|---|---|---|---|---|---|
| 4,253,673 | A | * | 3/1981 | Bailey | 473/596 |
| 4,452,007 | A | * | 6/1984 | Martin | 446/45 |
| 4,825,812 | A | * | 5/1989 | Visalli et al. | 119/64 |
| 4,861,304 | A | * | 8/1989 | Toews | 446/34 |
| 4,928,632 | A | * | 5/1990 | Gordon | 119/709 |
| 4,967,322 | A | * | 10/1990 | DuBois | 362/102 |
| 5,390,629 | A | * | 2/1995 | Simone | 119/711 |
| 5,595,142 | A | * | 1/1997 | Chill | 119/710 |
| 6,148,771 | A | * | 11/2000 | Costello | 119/709 |
| D503,645 | S | * | 4/2005 | Wirth et al. | D10/114.9 |
| 7,032,541 | B1 | * | 4/2006 | Tsengas | 119/710 |
| 7,087,260 | B2 | * | 8/2006 | Axelrod | 426/623 |
| 7,234,420 | B1 | * | 6/2007 | Tsengas | 119/710 |
| 7,490,579 | B2 | * | 2/2009 | Axelrod | 119/707 |
| D587,862 | S | * | 3/2009 | Rutherford | D30/160 |
| 7,506,614 | B1 | * | 3/2009 | Tsengas | 119/710 |
| 7,600,488 | B2 | * | 10/2009 | Mann | 119/710 |
| D638,589 | S | * | 5/2011 | Axelrod et al. | D30/160 |
| D655,057 | S | * | 2/2012 | Blair | D30/160 |
| 8,113,149 | B2 | * | 2/2012 | Quinn | 119/622 |
| 8,276,547 | B2 | * | 10/2012 | Markham | 119/709 |
| 8,342,132 | B2 | * | 1/2013 | Markham | 119/709 |

\* cited by examiner

*Primary Examiner* — Yvonne Abbott
(74) *Attorney, Agent, or Firm* — Gifford, Krass, Sprinkle, Anderson & Citkowski, P.C.

(57) ABSTRACT

A dog toy having a center portion and two opposedly positioned free ends. Each of the free ends of the elongated member includes a plurality of extension members [tines] having a first end connected to the elongated member and a free end spaced apart from the connected portion. The extension members are manufactured by a series of cuts made through each of the free ends of the elongated member. Hence, the user throws the stick through the air, wind or air passes through the slots created by the extension members thereby making an intermittent whistling noise to attract the dog's attention. Further, the extension members of the elongated member make a loud thrashing or clacking noise as the apparatus reaches the ground before retrieval.

16 Claims, 2 Drawing Sheets

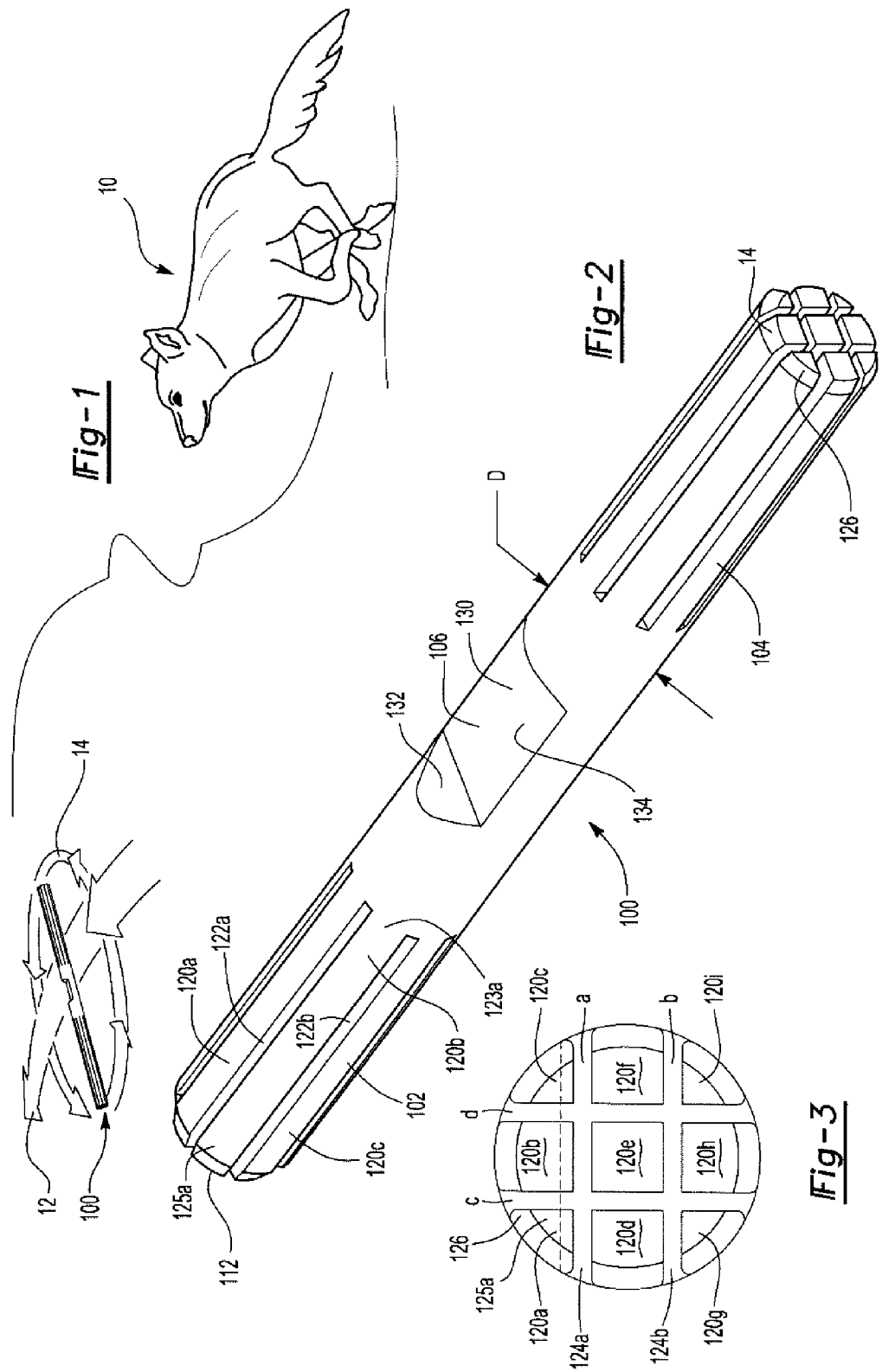

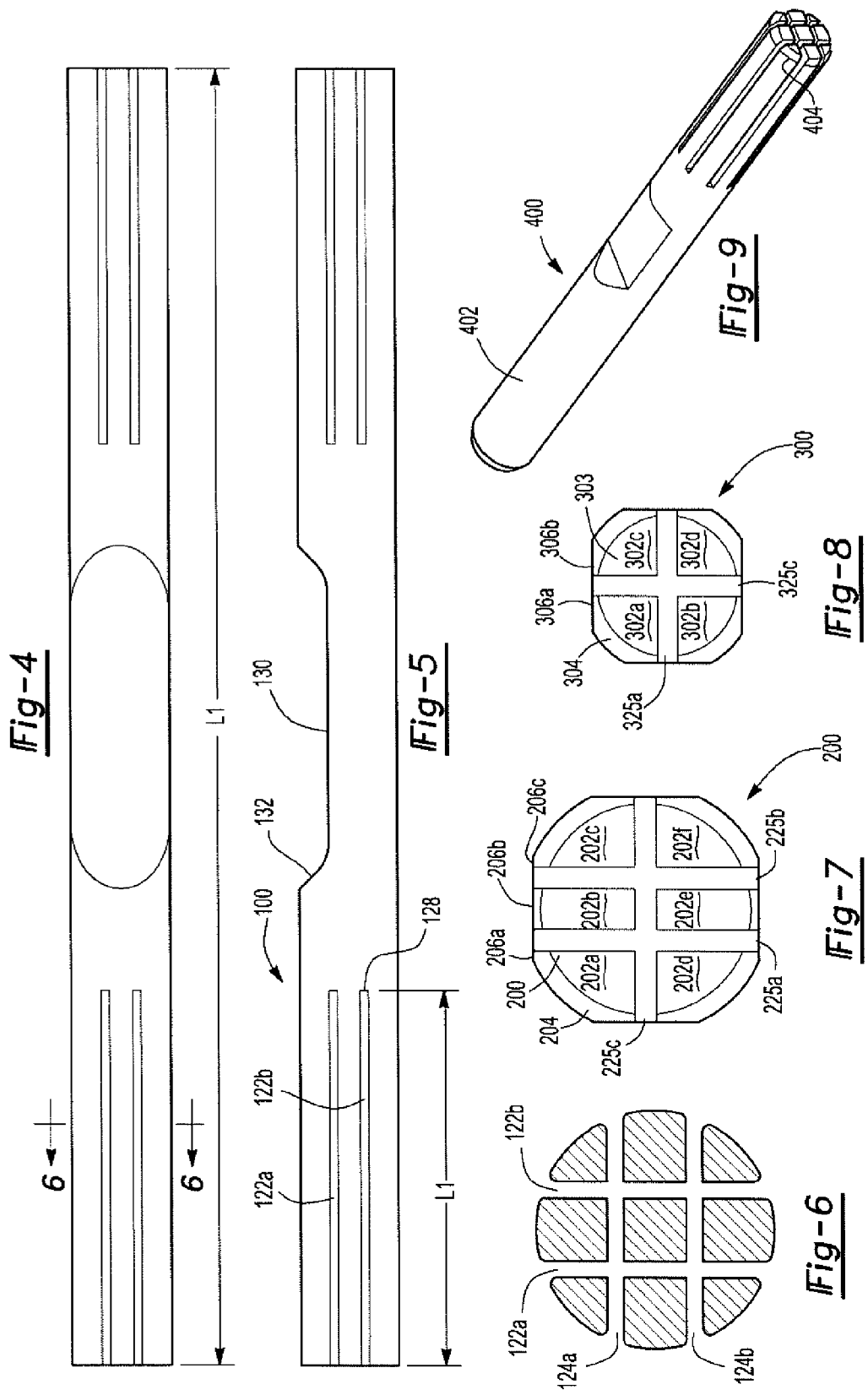

DOG TOY

CROSS-REFERENCE TO RELATED APPLICATIONS

This application claims priority of U.S. Provisional Patent Application Ser. No. 61/585,815 filed Jan. 12, 2012, which is incorporated herein by reference in the entirety.

FIELD OF THE INVENTION

This invention relates generally to dog toys or other animal toys. More particularly, this invention relates to dog toys or training apparatuses having sound creating structure.

BACKGROUND OF THE INVENTION

It is well known in the art to use a stick or branch from a tree or other elongated apparatus as a toy for a dog. It is commonly known for a dog's guardian to throw a stick and for the dog to retrieve said stick to its guardian. This game is commonly known as fetch. The sticks commonly used to play fetch are typically found in wooded areas wherein said sticks are fallen from trees. The sticks range between 1 foot to 3 feet and are typically between ½ inch to 2 inches in diameter. The well-loved art of the game of fetch has been improved over the years to include the use of tennis balls, Frisbees, or other objects capable of being airborne. Further, none of the known fetching instruments provide for a loud noise to gain a dog's attention once the fetching instrument falls to the ground while also providing an airborne noise while the apparatus is flying through the air to attract the dogs attention. Accordingly, there exists a need in the field to provide a fetching instrument which creates an enticing airborne noise to any dog to facilitate the long-lost art of fetch.

SUMMARY OF THE INVENTION

The present invention provides for an elongated member having a center portion and two opposedly positioned free ends. Each of the free ends of the elongated member includes a plurality of extension members having a first end connected to the elongated member and a free end spaced apart from the connected portion. The extension members are manufactured by a series of cuts made through each of the free ends of the elongated member. Hence, the user throws the stick through the air, wind or air passes through the slots created by the extension members thereby making an intermittent whistling noise to attract the dog's attention. Further, the extension members of the elongated member make a loud thrashing or clacking noise as the apparatus reaches the ground before retrieval.

BRIEF DESCRIPTION OF THE DRAWINGS

FIG. 1 illustrates the dog toy of the present invention in use;
FIG. 2 illustrates a perspective view of the present invention;
FIG. 3 illustrates a side view of the dog toy of the present invention;
FIG. 4 illustrates a longitudinal side view of the present invention;
FIG. 5 illustrates an alternative longitudinal side view of the present invention;
FIG. 6 illustrates a cross-section view of the present invention;
FIG. 7 illustrates a side view of a second embodiment of the present invention;
FIG. 8 illustrates a side view of a third embodiment of the present invention; and
FIG. 9 illustrates a perspective view of a fourth embodiment of the present invention.

DETAILED DESCRIPTION OF THE DRAWINGS

The present apparatus incorporates the element of sound into a traditional dog toy. The apparatus is comprised of an elongated element having a solid center portion and two oppositely opposed spaced apart free ends having a plurality of extension members. Each of the extension members are connected to the middle portion of the elongated member. When the user throws the stick through the air, wind or air passes through the slots machined between the extension members thereby making an intermittent whistling noise to attract the dog's attention. Further, the extension members of the elongated member make a loud thrashing or clacking noise as the apparatus reaches the ground before retrieval.

FIGS. 1-6 illustrate a first embodiment of the present invention. A tog toy apparatus 100 includes a center portion 106 and opposed spaced apart free ends 102, 104. The elongated member is shown at a predetermined length $L_1$. In the present embodiment, the predetermined length $L_1$ ranges between 6 inches and 3 feet. In the present embodiment, a diameter D ranges between ¼ inch and 3 inches.

The apparatus 100 includes the center portion 106. The center portion 106 is a solid generally cylindrical member. The center portion 106 may include a branding stamp on a surface 134 in a carved concave cut out portion 130. The center portion 106 having the carved out portion 130 is depicted for both functional purposes such as improved holding and for decorative reasons. The cut out concave portion 130 includes rounded upward edges 132.

The elongated member and apparatus 100 include a first free end 102 having a free end 112 and a second end 104 having a free end 114. The first end 102 having the free end 112 includes a plurality of tines, arms or extension members 120a, 120b, 120c . . . etc. The extension members 120a, 120b, 120c are separated by a plurality of slots 122a, 122b. The plurality of slots 122a, 122b are created by means of a saw cut through the first end 102 in a lateral direction. As shown in the figures to be discussed, a plurality of slots 122a, 122b are created to create a plurality of extension members 120a, 120b, 120c . . . etc.

The plurality of extension members 120a, 120b, 120c, 120d, 120e, 120f, 120g, 120h, 120i are all shown having a connected end 123a and a free end 125a. Each of the extension members 120a-120i includes a connected end 123a-123i and a free end 125a-125i.

FIG. 3 illustrates an end/side view of the apparatus 100. FIG. 3 illustrates the extension members 120a-120i. Each of the free ends 123a-123i includes a planar surface. FIG. 3 illustrates the apparatus 100 having four cuts a, b, c, d forming nine extension members 120a-120i. The cuts a, b, c, d form the plurality of slots 122a, 122b, 124a, 124b. The cuts a, b, c, d create the plurality of free ends 125a-125i. The present embodiment illustrates a series of 4 machined cuts (as illustrated in FIG. 3). However, this application is not intended to limit the number of machined slots to 4 (may contain more or less). It is well accepted that the invention will provided between 1 and 30 machined slots to create a plurality of extension members.

The concave cutout portion 130 is also provided with a rounded portion 132. The concave cutout portion 130 is used for both decorative purposes and for functional purposes as a handle. FIG. 4 further illustrates the length of the slots 122a and 122b. Although not pictured, the slots 124a, 124b are of similar length. The predetermined length $L_2$ is shown in FIG. 4. The predetermined length $L_2$, in this embodiment, ranges between 1 inch and 14 inches.

The slots 122a, 122b are pictured intersecting the slots 124a, 124b. The slots 124a, 124b have an open end depicted at 129 and a closed end depicted at 128 towards the middle portion 106 of the apparatus 100. The slots 122a, 122b, 124a, 124b create a plurality of planar surfaces on the extension members 120a-120i. By way of example, extension member 120a includes a vertical planar surface 156 and a horizontal planar surface 158 created by the slot 122a and the slot 124a. Furthermore, the cylindrical shaped elongated member or apparatus 100 includes rounded outer surfaces 154 of the extension members 120a-120i. By way of example, the outer end surface 154 of the extension member 120f has been radiused to accommodate the octagonal shape of the elongated member or apparatus 100.

FIG. 7 illustrates a second embodiment of the present invention. The dog toy apparatus 200 of FIG. 7 illustrates six arms, tines or extension members 202a, 202b, 202c, 202d, 202e, 202f. The extension members 202a, 202b, 202c, 202d, 202e, 202f are similar in shape to those illustrated in the first embodiment discussed above. The extension members 202a, 202b, 202c, 202d, 202e, 202f further include rounded corners 204 at the free 203.

FIG. 7 further illustrates a plurality of planar portions 206a, 206b, 206c. The planar portions 206a, 206b, 206c extend a small distance away from the slots 225a, 225b, 225c. These planar portions 206a, 206b, 206c allow the machining process of the apparatus 200 to create smoother slots and cuts. Further the planar portions 206a, 206b, 206c prevent rolling of the apparatus 200 when the apparatus 200 rests on a surface, such as a table. The planar portions are applied to any area next to the slots 225a, 225b, 225c. The planar portions shown in FIG. 7 (and in FIG. 8) may be equally applied to the first embodiment described above.

FIG. 8 illustrates a third embodiment of the present invention. The dog toy apparatus 300 of FIG. 8 illustrates 4 arms, tines or extension members 302a, 302b, 302c, 302d. The extension members 302a, 302b, 302c, 302d are similar in shape to those illustrated in the first embodiment discussed above. The extension members 302a, 302b, 302c, 302d further include rounded corners 304 at the free 303.

FIG. 7 further illustrates a plurality of planar portions 306a, 306b. The planar portions 306a, 306b extend a small distance away from the slots 325a, 325b. These planar portions 306a, 306b allow the machining process of the apparatus 300 to create smoother slots and cuts. Further the planar portions 306a, 306b prevent rolling of the apparatus 300 when the apparatus 300 rests on a surface, such as a table. The planar portions are applied to any area next to the slots 325a, 325b.

In a fourth embodiment of the invention, the apparatus 400 includes a sold end 402 not having any extensions members while an opposite end 404 includes any number of extension members. FIG. 9 illustrates the apparatus 400 having nine extension members, but may just as easily include 2-50 extension members (such as the second and third embodiments shown in FIGS. 7 and 8). The solid end 402 acts as a gripping handle for throwing by the user.

Any of the embodiments discussed bay also be used to hold a feather, or other scented object, for purposes of training. For purposes of scent training a feather is placed through the slots of any of the embodiments discussed above. As the apparatus is thrown through the air for retrieval, the dog is able to track the sound and scent of the apparatus and the feather.

The present invention and current embodiment illustrate the invention comprised of a wood or wood like material. The preferred embodiment is wood. However, the invention and bulk of the body of the elongated member may also be comprised of rubber, hard rubber, composite material, fiber composite material, plastic, silicone, metal, foam or any other colorable variation of material thereof. This description is not intended to limit the material in any way shape or form.

This invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A dog toy used for purposes of play and retrieval, the dog toy comprising:
    an elongated member having a first end and a second end, an elongated portion extending between the first end and the second end, the elongated member further including a holding portion; and
    a plurality of tines positioned on at least one of the first end or the second end, the plurality of tines extending along the elongated portion of the elongated member, the tines extending away from the elongated member wherein as the user throws the dog toy through the air the dog toy generates a whistling noise when air passes through the plurality of tines and creates a clacking noise when the dog toy reaches the ground.

2. The dog toy of claim 1 wherein the elongated member and the elongated portion are generally cylindrical.

3. The dog toy of claim 1 wherein the other of the first or second end not including the tines is solid thereby acting as the holding portion.

4. The dog toy of claim 3 wherein the tines are spaced apart from the holding portion.

5. The dog toy of claim 3 wherein the holding portion is position in the center of the elongated portion.

6. The dog toy of claim 5 wherein the holding portion includes an indented gripping portion.

7. The dog toy of claim 1 wherein both the first end and the second end include the plurality of tines.

8. The dog toy of claim 7 wherein the holding portion separates the tines of the first end from the tines of the second end.

9. The dog toy of claim 1 wherein there are 4 tines at one of the first end or the second end.

10. The dog toy of claim 1 wherein there are 4 tines at each of the first end and the second end.

11. The dog toy of claim 1 wherein there are 6 tines at one of the first end or the second end.

12. The dog toy of claim 1 wherein there are 6 tines at each of the first end or the second end.

13. The dog toy of claim 1 wherein there are 9 tines at one of the first end or the second end.

14. The dog toy of claim 1 wherein there are 9 tines at each of the first end or the second end.

15. The dog toy of claim 1 wherein a feather or other scented item is placed between the tines for purposes of training.

16. The dog toy of claim 1 wherein the tines include a flat portion adjacent a slot created by the plurality of tines.

\* \* \* \* \*